(12) United States Patent
Kennett et al.

(10) Patent No.: US 12,278,971 B2
(45) Date of Patent: Apr. 15, 2025

(54) SELECTIVELY ENHANCING COMPRESSED DIGITAL CONTENT

(71) Applicant: Microsoft Technology Licensing, LLC, Redmond, WA (US)

(72) Inventors: Daniel Gilbert Kennett, Bellevue, WA (US); Eric Cameron Walston, Kirkland, WA (US); Matthew Gordon, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 287 days.

(21) Appl. No.: 17/326,020

(22) Filed: May 20, 2021

(65) Prior Publication Data

US 2021/0274224 A1    Sep. 2, 2021

Related U.S. Application Data

(63) Continuation of application No. 16/436,796, filed on Jun. 10, 2019, now Pat. No. 11,032,576.

(51) Int. Cl.
*H04N 19/186* (2014.01)
*G06F 18/214* (2023.01)
(Continued)

(52) U.S. Cl.
CPC ....... *H04N 19/167* (2014.11); *G06F 18/2155* (2023.01); *G06F 18/40* (2023.01);
(Continued)

(58) Field of Classification Search
CPC .... H04N 19/167; H04N 19/186; H04N 19/59; H04N 19/86; G06F 18/40; G06F 18/2155;
(Continued)

(56) References Cited

U.S. PATENT DOCUMENTS

| | | | | |
|---|---|---|---|---|
| 8,457,311 | B1* | 6/2013 | Schultz | H04N 7/167 380/201 |
| 2005/0089215 | A1* | 4/2005 | Staelin | G06N 3/048 382/268 |

(Continued)

FOREIGN PATENT DOCUMENTS

| | | |
|---|---|---|
| CN | 102783132 A | 11/2012 |
| CN | 104471939 A | 3/2015 |
| CN | 107113464 A | 8/2017 |

OTHER PUBLICATIONS

Office Action Received for Chinese Application No. 202080042707.2, mailed on May 29, 2024, 9 pages (English Translation Provided).
Office Action Received for Chinese Application No. 202080042707.2, mailed on Jan. 8, 2024, 13 pages (English Translation Provided).
Office Action Received for Indian Application No. 202147052611, mailed on Oct. 17, 2023, 7 pages.

(Continued)

*Primary Examiner* — Chikaodili E Anyikire
*Assistant Examiner* — Berteau Joisil
(74) *Attorney, Agent, or Firm* — Ray Quinney & Nebeker; James Bullough

(57) ABSTRACT

The present disclosure relates to systems, methods, and computer-readable media to selectively enhance digital image and video content. For example, systems disclosed herein can encode original video content to compress and decompress the original video content. Systems described herein can further identify area of interest information for use in identifying portions of decompressed video content to analyze and remove one or more compression artifacts found therein. Systems described herein can further enhance the decompressed video content by increasing resolution for display. By identifying areas of interest and selectively enhancing digital video content, the systems described herein can reduce consumption of bandwidth and processing (Continued)

resources while maintaining high visual quality of the digital content.

20 Claims, 9 Drawing Sheets

(51) Int. Cl.
| | | |
|---|---|---|
| | G06F 18/40 | (2023.01) |
| | G06T 3/4046 | (2024.01) |
| | G06T 3/4053 | (2024.01) |
| | G06T 5/50 | (2006.01) |
| | G06T 5/70 | (2024.01) |
| | H04N 19/167 | (2014.01) |
| | H04N 19/59 | (2014.01) |
| | H04N 19/86 | (2014.01) |

(52) U.S. Cl.
CPC .......... *G06T 3/4046* (2013.01); *G06T 3/4053* (2013.01); *G06T 5/50* (2013.01); *G06T 5/70* (2024.01); *H04N 19/186* (2014.11); *H04N 19/59* (2014.11); *H04N 19/86* (2014.11); *G06T 2200/24* (2013.01); *G06T 2207/10016* (2013.01); *G06T 2207/20081* (2013.01); *G06T 2207/20084* (2013.01); *G06T 2207/20182* (2013.01)

(58) Field of Classification Search
CPC ..... G06T 3/4046; G06T 3/4053; G06T 5/002; G06T 5/50
See application file for complete search history.

(56) References Cited

U.S. PATENT DOCUMENTS

| | | | | |
|---|---|---|---|---|
| 2005/0117798 | A1 | 6/2005 | Patton | |
| 2009/0300701 | A1* | 12/2009 | Karaoguz | ...... H04N 21/234363 |
| | | | | 725/131 |
| 2014/0114531 | A1* | 4/2014 | Sugiyama | ............. G06F 3/0481 |
| | | | | 701/36 |
| 2015/0334398 | A1* | 11/2015 | Socek | .................. H04N 19/182 |
| | | | | 375/240.26 |
| 2019/0139205 | A1* | 5/2019 | El-Khamy | ............ G06F 18/214 |
| 2020/0051260 | A1* | 2/2020 | Shen | ...................... G06N 20/00 |

OTHER PUBLICATIONS

Notice of Grant Received for Chinese Application No. 202080042707. 2, mailed on Sep. 20, 2024, 9 pages. (English Translation Provided).
Office Action Received for Indian Application No. 202147052611, mailed on Oct. 1, 2024, 03 pages.
Office Action Received for Indian Application No. 202147052611, mailed on Sep. 2, 2024, 03 pages.
Communication pursuant to Article 94(3) EPC, Received for European Application No. 20727458.0, mailed on Nov. 18, 2024, 5 pages.
Tian et al., "Deep Learning for Image Denoising: A Survey", arxiv.org, Cornell University Library, 201 Olin Library Cornell University Ithaca, NY 14853, Oct. 11, 2018, 10 pages.

* cited by examiner

SELECTIVELY ENHANCING COMPRESSED DIGITAL CONTENT

CROSS-REFERENCE TO RELATED APPLICATIONS

This application is a continuation of U.S. patent application Ser. No. 16/436,796, filed on Jun. 10, 2019, the entirety of which is incorporated herein by reference.

BACKGROUND

Recent years have seen a precipitous rise in the use of computing devices (e.g., mobile devices, personal computers) to receive, store, edit, stream, or otherwise display digital media. Indeed, it is now common for consumer electronic devices to display live video from a number of different remote sources. Further, as personal computers, mobile devices, gaming consoles, and other consumer electronic devices become more prevalent, a wider variety of electronic devices having different computing and display capabilities are being used in various digital media applications. Moreover, as computing devices become more complex, display capabilities of computing devices have similarly improved.

While computing devices provide useful tools in displaying digital media, conventional systems for delivering and displaying digital media include a variety of problems and drawbacks. For example, as digital media increases in quality, connectivity resources (e.g., bandwidth) are often insufficient to enable content providers to stream or otherwise provide high quality media. Further, even where connectivity resources are sufficient and available to provide high quality media content, consumers often experience frustration at various costs associated with downloading and processing a higher quantity of digital content. Moreover, conventional encryption and decryption techniques for generating and transmitting media content often results in low quality content displays.

These and other problems exist with regard to transmitting and displaying digital video content.

DETAILED DESCRIPTION

Figure 1:
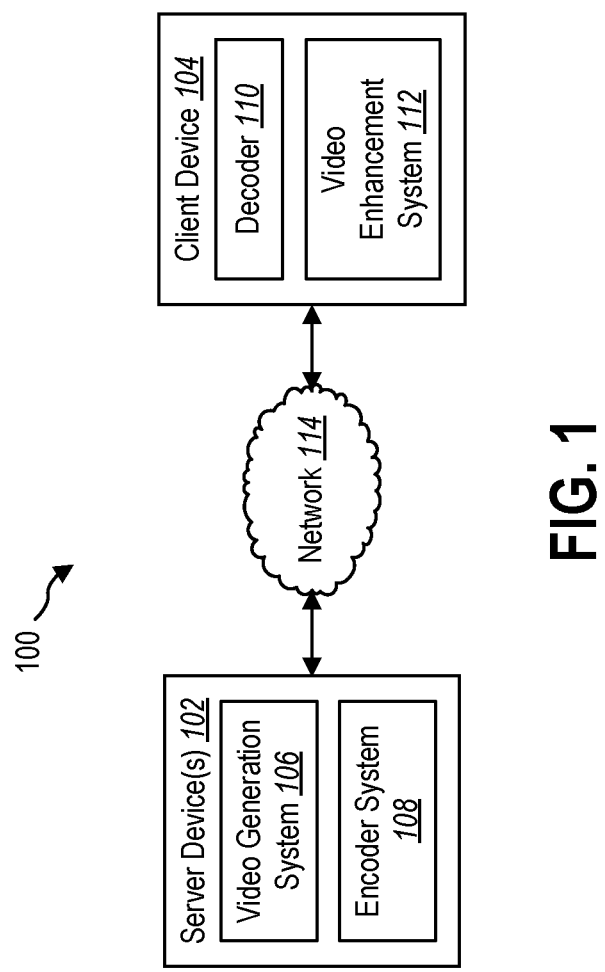
FIG. 1 illustrates an example environment including an encoder system and video enhancement system in accordance with one or more embodiments.

The present disclosure relates generally to an encoder system and digital video enhancement system for selectively enhancing video content based on areas of importance identified within the video content. In particular, as will be discussed in further detail below, a server device may include an encoder system that compresses video content to be streamed (e.g., live-streamed) or otherwise provided to a client device. The encoder system can generate a compressed digital video by applying a compression or encoding algorithm to the video content prior to transmitting the compressed video content to the client device. Moreover, as will be discussed in further detail below, the encoder system can identify and provide area of interest information to the client device associated with important portions (e.g., pixel regions and/or color channels) of the video content to enable a client device to selectively repair, refine, and otherwise enhance portions of the video content associated with the area of interest information.

In addition to an encoder system, the present disclosure relates to a video enhancement system for selectively repairing, refining, and otherwise enhancing select portions of digital video content. For example, as will be discussed in further detail below, a video enhancement system may identify an area of interest for a decoded video frame (e.g., a decompressed video frame) corresponding to one or more important portions of the video frame. The video enhancement system may then apply a denoising model to the decoded video frame to remove one or more compression artifacts introduced to the digital content during a compression and decompression process. Once the decoded video frame is denoised, the video enhancement system may further refine the decoded video frame by interpolating pixels, up-sampling, or otherwise increasing the pixel resolution for the repaired video frame prior to displaying an output video frame via a graphical user interface of a display device. Indeed, the encoder system and video enhancement system can apply a similar process to any number of video frames for a decompressed or streaming digital video.

As will be discussed in further detail herein, the present disclosure includes a number of practical applications that provide benefits and/or solve problems associated with delivering and displaying digital video content via a graphical user interface of a client device. For example, by identifying an area of interest for a video frame, the video enhancement system can significantly reduce processing resources expended when repairing or otherwise enhancing digital video content. Indeed, by selectively repairing artifacts in important portions of a video frame, the video enhancement system can generate a quality video frame in which the most important portions of the video frame are preserved and have a high quality even where a client device has limited processing resources or where expending a higher quantity of processing resources results in video delay and/or poor battery performance.

Moreover, by identifying areas of interest, the video enhancement system can leverage one or more robust and accurate machine learning models while preserving expense of computing resources. For example, the video enhancement system may selectively apply a denoising model trained to remove artifacts from an input image to an identified area of interest of a decoded video frame to remove artifacts from the identified area of interest rather than analyzing every pixel or additional portions of the decoded video frame. As a further example, the video enhancement system can apply a super resolution model to a repaired image (e.g., the repaired decoded video frame) or select portions of the repaired image to further enhance the image while efficiently utilizing computing resources. Moreover, one or more embodiments described herein involve machine learning models trained to generate segmentation maps and/or image buffers to indicate key areas of interest in different implementations.

As will be discussed in further detail and in connection with multiple embodiments below, the video enhancement system and encoder system may cooperatively identify and leverage area of interest information in a variety of ways. For example, where a developer of the video content (e.g., a game developer) is aware of cloud computing or compression considerations, the encoder system and/or video enhancement system may leverage that area of interest information in effective and efficient ways when enhancing video quality. For instance, a game developer may cause a video generation system to provide area of interest information in conjunction with provided gaming content. Moreover, even where an original source of content does not generate or provide area of interest information, examples described herein involve a variety of ways in which area of interest information is identified by the encoder system and/or video enhancement system to more efficiently enhance digital video content.

By more efficiently utilizing processing and bandwidth resources, the systems described herein may provide significant flexibility in generating and delivering digital video content. For example, by more efficiently utilizing processing and bandwidth resources, the systems described herein facilitate higher quality output without increasing bandwidth consumption. In addition, or as an alternative, systems described herein may reduce bandwidth consumption while maintaining a high or threshold quality of video content. Indeed, depending on any number of user or system preferences and settings (e.g., bandwidth budgets, cellular data usage limits, selected graphics settings, battery consumption settings), the systems described herein can provide a number of different benefits in operation of a client device when displaying digital video content.

As illustrated in the foregoing discussion, the present disclosure utilizes a variety of terms to described features and advantages of the systems described herein. Additional detail is now provided regarding the meaning of such terms. For example, as used herein, a "digital video," "digital video content," or "video content" may refer interchangeably as digital data representative of a sequence of digital images (e.g., a plurality of digital video frames). A digital video may include digital data or a digital file that is displayable via a graphical user interface of a display of a computing device. For instance, a digital video may include a sequence of images that include pixel data referring to discrete units or elements of a digital image that, when combined form the displayable content of the digital image. A digital video may have a corresponding frame rate, resolution, or duration. By way of example, a digital video may refer to a digital file having one of the following extensions: AVI, FLV, WMV, MOV, MP4. As used herein, a "video frame" or "digital video frame" refers to a discrete frame of video content from the digital video content.

In one or more implementations described herein, a digital video may refer to a compressed digital video. As used herein, a "compressed digital video" or "encoded video" refers to a digital video whose pixel data has been reduced using one of a variety of compression techniques. For example, a compressed digital video may refer to a digital video (or series of video frames) that has been compressed using lossy or lossless compression algorithms. As a further example, in one or more embodiments, a compressed digital video is compressed using one or more block-oriented motion-compensation-based video compression standards. For instance, a compressed digital video may be compressed using formats including H264, H.265, MPEG-4, VP9, VP10, or any other encoding or compression format.

In contrast to a compressed digital video, in one or more embodiments described herein, a digital video may refer to a decompressed digital video. As used herein, a "decompressed digital video" or "decoded digital video" refers to a digital video that has been generated from a compressed digital video into an approximation of the original form of the digital video. For example, in one or more implementations described herein, a decompressed digital video is generated by applying a decoding or decompression algorithm to a compressed digital video file (or stream of compressed digital video content) based on a format of the compressed digital video and/or compression algorithm applied to an original video to generate the compressed digital video. In one or embodiments described herein, a decompressed digital video refers to a decompressed portion of streaming video content that is decompressed as it is received and presented via a graphical user interface.

In one or more embodiments described herein, an area of interest is identified for one or more video frames. As used herein, an "area of interest" refers to a discrete portion of a video frame (or multiple video frames). For example, an area of interest may refer to a cropped portion of an image or a region of pixels from a digital video frame. In one or more implementations, an area of interest refers to multiple discrete regions of pixels at different locations within a digital image. For instance, an area of interest may refer to a first region of pixels and a second non-overlapping region of pixels from a corresponding video frame. An area of interest may be uniform across multiple video frames or may change from frame to frame. In one or more embodiments, an area of interest refers to a channel (e.g., a color channel, chroma channel, luminance channel) that forms a portion of an image that, when combined with additional channels, forms the digital image. Further examples of areas of interest will be discussed in further detail below.

In one or more embodiments described herein, various systems leverage one or multiple machine learning models to perform various functions with respect to the digital video content. As used herein, a "machine learning model" refers to one or more computer algorithms or models (e.g., a classification model, a regression model) that can be tuned (e.g., trained) based on training input to approximate unknown functions. For example, a machine learning model may refer to a neural network (e.g., a convolutional neural network, a recurrent neural network) or other architecture that learns and approximates complex functions and generates outputs based on one or more inputs provided to the machine learning model. As will be discussed in connection with various examples herein, different machine learning models may generate different types of outputs (e.g., repaired images, up-sampled images, segmentation masks) based on how the machine learning model has been trained to generate those outputs.

Additional detail will now be provided regarding systems for delivering and enhancing digital video content in relation to illustrative figures portraying example implementations. For example, FIG. 1 illustrates an example environment 100 in which digital video is delivered to a client device and selectively enhanced in accordance with one or more embodiments described herein. As shown in FIG. 1, the environment 100 includes one or more server device(s) 102 and a client device 104. The server device(s) 102 includes a video generating system 106 and an encoder system 108. As further shown, the client device 104 includes a decoder system 110 and a video enhancement system 112.

As further shown in FIG. 1, the server device(s) 102 and client device 104 may communicate with each other directly or indirectly through a network 114. The network 114 may include one or multiple networks and may use one or more communication platforms or technologies suitable for transmitting data. The network 114 may refer to any data link that enables the transport of electronic data between devices and/or modules of the environment 100. The network 114 may refer to a hardwired network, a wireless network, or a combination of a hardwired and a wireless network. In one or more embodiments, the network 114 includes the Internet.

The client device 104 may refer to various types of computing devices. For example, the client device 104 may include a mobile device such as a mobile telephone, a smartphone, a personal digital assistant (PDA), a tablet, or a laptop. Additionally, or alternatively, the client device 104 may include a non-mobile device such as a desktop computer, server device, or other non-portable device. In one or more embodiments, the client device refers to a gaming device, such as a dedicated handheld gaming device or a video game console in communication with a display device. In one or more implementations, the client device 104 refers to a system of multiple devices (e.g., a gaming console and associated display device) The client device 104 may additionally include a graphical user interface thereon (e.g., a screen of a mobile device). In addition, or as an alternative, the client device 104 may be communicatively coupled (e.g., wired or wirelessly) to a display device having a graphical user interface thereon for providing a display of digital video content. The server device(s) 102 may similarly refer to various types of computing devices. Each of the devices of the environment 100 may include features and functionality described below in connection with FIG. 7.

Figure 2:
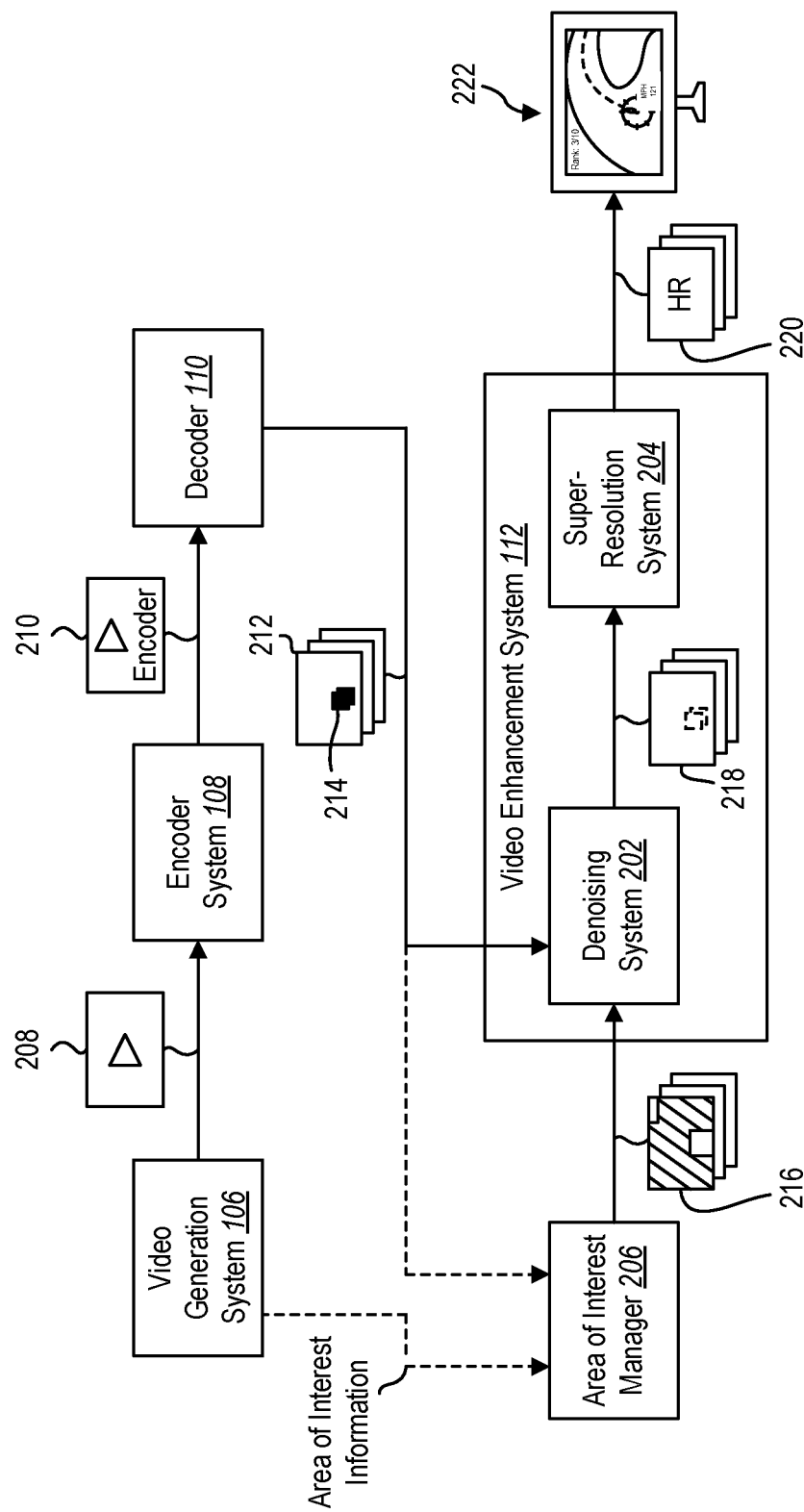
FIG. 2 illustrates an example implementation of the encoder system and video enhancement system in accordance with one or more embodiments.

Additional detail will now be given in connection with an example implementation in which components of the environment 100 facilitate efficient delivery and enhancement of digital video for display via a graphical user interface of the client device 104. FIG. 2 illustrates an example implementation in which the video enhancement system 112 including a denoising system 202 and a super-resolution system 204 for enhancing digital video content and providing a display of the enhanced digital video content via a graphical user interface of a display device 222.

As shown in FIG. 2, the video generation system 106 may generate original video content 208. The original video content may refer to live video generated by a video generation system 106 on the same or different server device as the encoder system 108. The original video content 208 may refer to video game content generating by a gaming server to be live-streamed to the client device 104. The original video content 208 may have an original resolution and bit rate depending on capabilities and configurations of the video generation system 106 and/or development specifications of a client device 104, video generation server or other video generating application.

In one or more embodiments, the video generation system 106 generates and provides area of interest information to one or more components of the environment 100. For instance, in the example illustrated in FIG. 2, the video generation system 106 generates and provides area of interest information to an area of interest manager 206. This area of interest information may include information provided by a developer of the original video content 208. For example, the area of interest information may include an identification of input elements, heads-up display (HUD) elements (e.g., elements displayed as part of a user interface), or any other graphical user interface element to be displayed in connection with digital video content. The area of interest manager 206 may be implement on the server device(s) 102, client device 104, or include different features implemented between the different devices. Additional detail in connection with identifying and utilizing area of interest information will be discussed in further detail below.

In providing the original video content 208 to the client device 104, an encoder system 108 may be used to compress the original video content 208 and generate a compressed digital video 210. In particular, the encoder system 108 may generate a compressed digital video 210 having a format that can be transmitted to the client device 104 over the network 114. For example, the encoder system 108 may apply an encoding algorithm to compress the original video content 208 and provide compressed video content to the client device 104 via a wireless connection. In one or more embodiments described herein, the compressed video 210 is live-streamed to the client device 104.

As shown in FIG. 1, the encoder system 108 may refer to a single instance of an encoder system 108 including features and functionality in connection with various exampled described herein that corresponds to an associated video content generator 106. Alternatively, in one or more embodiments, the server device(s) 102 may include multiple video content generators 106 that each provide video game content to a shared encoder system 108 equipped to encode video content and provide compressed digital video to any number of devices. Accordingly, while one or more embodiments of the encoder system 108 involves the encoder system 108 being implemented as part of the same hardware and/or software of the video content generator(s), the encoder system 108 may alternatively be implemented on a separate hardware device to be implemented independent from the video content generator(s).

Upon receiving the compressed video content, the client device 104 may apply a decoder 110 to the compressed video 210 to generate a decompressed digital video 212 including a plurality of decompressed video frames. In particular, the decoder 110 may apply a decoding algorithm to the compressed video 210 (e.g., depending on a format of the compressed video 210) to reconstruct the digital video content from the encoded data to approximate the original video generated by the video generation system 106. The decompressed video 212 may include a bit rate and/or resolution corresponding to the bit rate and resolution of the original video content 208 provided by the video generation system 106. Alternatively, in one or more embodiments, the decompressed video 212 may include a lower resolution and/or lower bit rate than the original video content 208. For example, where network connectivity is limited between the client device 104 and a server device, the decompressed video 212 may have a lower resolution or lower bit rate than the resolution and bit rate of the original video content 208 to preserve bandwidth or other networking resources.

As shown in FIG. 2, one or more video frames may include one or more decompression artifacts 214 as a result of compressing and decompressing the original video content 208. As used herein, an "artifact" or "decompression artifact" refers to any loss of data between the original video content 208 and the decompressed digital video content 212 introduced as a result of compressing and decompressing the digital video. For example, a compression artifact may refer to imperfections such as lost pixels, pixilation effects, downsampling as a result of encoding and decoding, blurriness, distortion of content, shadowing, noise, graininess, or any other effect caused by loss of data as a result of compressing and decompressing the digital content. A compression artifact may include a localized artifact (e.g., such as the localized compression artifact 214 shown in FIG. 2). Alternatively, a compression artifact may refer to an effect of lost data over an entire image (e.g., graininess or reduced resolution over the entire image).

In one or more embodiments, the decompressed video content 212 is provided to the area of interest manager 206. The area of interest manager 206 may identify or otherwise determine an area of interest within video content in a variety of ways. In one or more embodiments, the area of interest manager 206 determines regions of pixels within one or more video frames based on area of interest information received from the video generation system 106. For example, the area of interest manager 206 may receive an identification of heads-up display (HUD) elements within the video content and map the heads-up display (HUD) elements to regions of pixels within the received decompressed video content 212. The area of interest manager 206 may utilize area of interest information to generate segmentation masks 216 or other image buffers including identified regions of pixels corresponding to the area of interest information. Further information in connection with identifying areas of interest information is discussed in further detail below in connection with FIGS. 3A-4.

The decompressed digital video content 212 may be provided to the denoising system 202 in addition to the segmentation mask(s) 216. The denoising system 202 may include a denoising model (e.g., a machine learning model) trained to extract, repair, or otherwise remove decompression artifacts included within the decompressed video content 212. For example, the denoising system 202 may apply a machine learning model to a video frame including an artifact 214 and generate an output image that approximates the original video content 208 based on training data previously utilized in training the denoising model.

A denoising system 202 may be trained to remove compression artifacts in a variety of ways. For example, in one or more embodiments, the denoising system 202 may include a machine learning model trained by providing pairs of images including a first plurality of original images prior to compression and a second plurality of digital images after being compressed and decompressed. In this way, the denoising system 202 may be trained to approximate or estimate how a digital image having a variety of different compression artifacts would appear prior to introducing the compression artifacts via the compression and decompression processes.

While the denoising system 202 may be trained to remove artifacts generally, in one or more embodiments, the denoising system 202 is trained or refined based on a particular type or source of video content. As an example, in some examples, the original video content 208 may refer to a gaming or other application in which the area of interest is uniform or limited to a limited set of regions within respective video frames. Where the area of interest is known, the denoising system 202 may be trained specifically to remove artifacts in the specific areas of interest. In this way, the area of interest information may be used to more efficiently train the denoising system 202 for one or more specific applications.

As shown in FIG. 2, the denoising system 202 may provide repaired video frames 218 as inputs to a super-resolution system 204 for further enhancement of the video content. For example, the super-resolution system 204 may include a super-resolution model (e.g., a machine learning model) trained to up-sample or otherwise increase the pixel resolution of one or more video frames. Accordingly, the super-resolution system 204 may receive the repaired video frames 218 and generate high resolution video frames 220 to display via a display device 222. As used herein, "high resolution video frames" may refer to video frames having a higher resolution than the decompressed video frames generated by the decoder 110.

In one or more embodiments, the super-resolution system 204 includes a machine learning model trained to generate high resolution video frames. In particular, the super-resolution system 204 may be trained based on pairs of high-resolution images and corresponding low-resolution images. In one or more implementations, the pairs of images refer to images that do not include artifacts (e.g., referring to a different set of training images as those used to train the denoising model). For example, while not shown in FIG. 1, the server device(s) may include a model training system that generates or otherwise obtains down-sampled versions of the original video content and trains the super-resolution system 204 (or a model implemented the super-resolution system 204) based on pairs of video frames from the original video content and corresponding down-sampled versions of the video frames from the original video content. In this way, a super-resolution system 204 may be trained to approximate up-sampled versions of digital video content based on the pairs of training images.

As shown in FIG. 2, the high-resolution video frames 220 may be displayed via a graphical user interface. For example, the high-resolution video frames 220 may be streamed to a display device (e.g., a mobile device) to be displayed as the high-resolution video frames are generated 220. It is noted that the process of denoising and increasing the resolution (e.g., up-sampling, interpolating pixels) of the digital video frames may be performed local to the client device 104. In this way, the video enhancement system 112 may repair and generate high-resolution video frames 220 without consuming additional connectivity resources (e.g., bandwidth, cellular data).

Each of the components shown in FIG. 2 may perform one or more of the processes described above in accordance with various settings or preferences to accomplish a number of different benefits. For example, in one or more embodiments, the video enhancement system 112 may denoise (e.g., remove artifacts) the decompressed video frames 212 and generate the high-resolution output video frames 220 to approximate video frames having a similar resolution and bit rate as the original video content 208. For example, to save bandwidth resources, the encoder system 108 may compress the digital video to generate the encoded video content 210 having a lower resolution or bit rate than the original video content 208 to reduce bandwidth resources expended when providing the video content over the network 114. Alternatively, the encoder system 108 still generate a lossless or near lossless compression of the original video content 208 while still generating a very high-quality output image by further up-sampling or otherwise enhancing the resolution after removing one or more compression artifacts.

In one or more embodiments, the video enhancement system 112 may omit the super-resolution system 104 or simply provide the repaired video frames 218 as outputs to be displayed via the display device 222. For example, where the video enhancement system 112 does not include a super-resolution system 204 or where the quality of video is already at a high enough level of quality to be displayed, the video enhancement system 112 may simply provide the repaired video frames 218 to a display device 222 for display via a graphical user interface.

In a further example, one or both of the components 202-204 of the video enhancement system 112 may be applied to selective portions of digital images provided to the video enhancement system 112. For example, as mentioned above, the denoising system 202 may apply a denoising model exclusively to portions of a video frame corresponding to the identified area of interest without applying the denoising system 202 to other portions of the video frame. Similarly, the super-resolution system 204 may apply a super-resolution model to selective portions of the video frame to selectively up-sample portions of the video frame to have a higher quality of visual content for those portions of the video frame identified as important. In one or more implementations, selectively up-sampling subregions of a video frame may involve applying a machine learning based algorithm to key regions while applying a simpler up-sampling function to other regions of the video frame(s) to result in the video frames being up-sampled to the same target resolution.

As an alternative to selectively applying various models to exclusive portions of the video frame(s), the video enhancement system 112 may further prioritize processing video frames in accordance with identified areas of interest. For example, in one or more embodiments, the video enhancement system 112 may prioritize denoising and/or increasing the resolution of select portions of video frames for identified areas of interest while still denoising and/or increasing resolution of other portions of the video frame depending on processing and bandwidth budgets. For instance, where a setting or preference indicates a maximum computational budget or bandwidth budget in connection with a minimum or preferred quality of output, the video enhancement system 112 may prioritize enhancing (e.g., denoising, increasing resolution) video frames to identified areas of interest while expending any additional available resources to enhance other portions of the video frames where the computational and/or bandwidth budgets permit. Moreover, in one or more embodiments, rather than exclusively enhancing portions or prioritizing enhancement, the video enhancement system 112 may simply apply a more rigorous or robust enhancement (e.g., a more robust denoising) on the areas of interest while applying a less rigorous or robust enhancement on other areas of video frames.

Figure 3A:
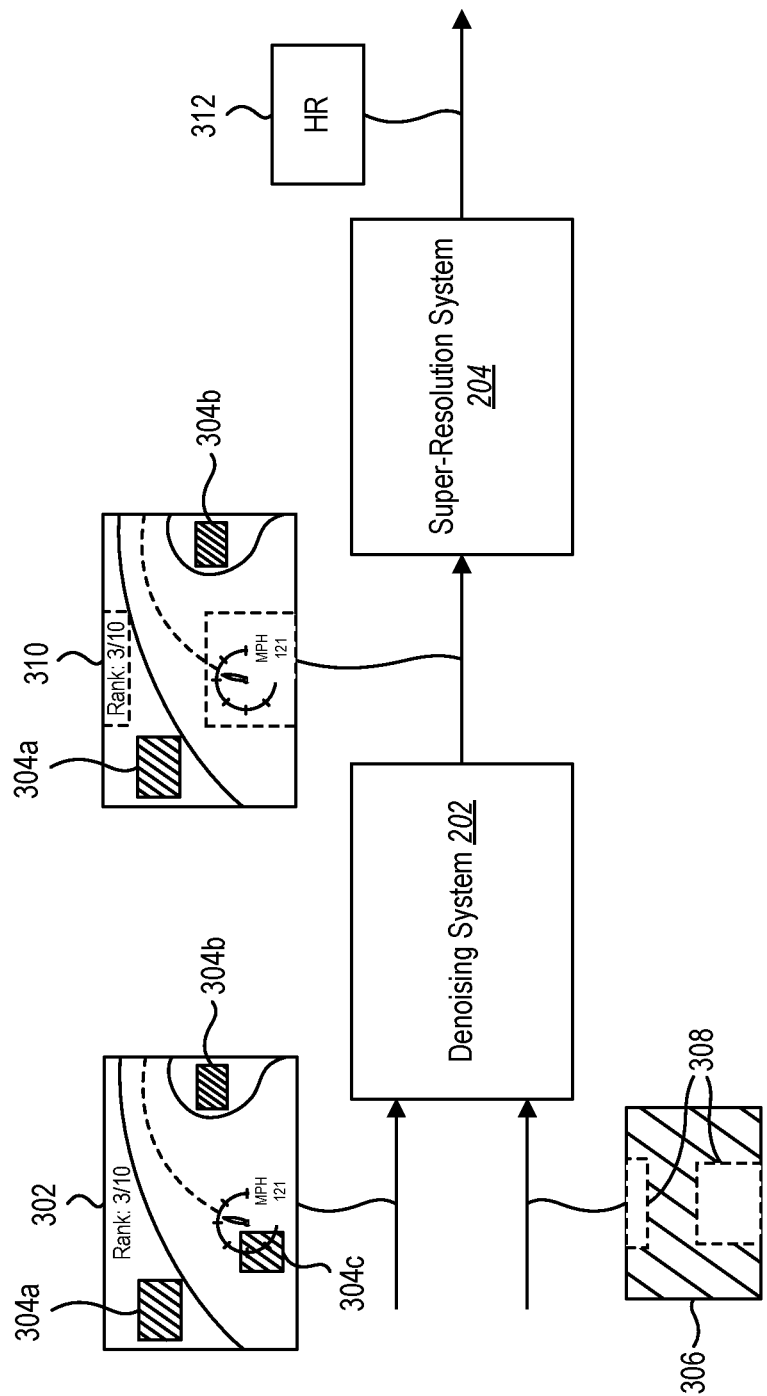
FIGS. 3A-3C illustrate further example implementations of the encoder system and video enhancement system in accordance with one or more embodiments.
Figure 3B:
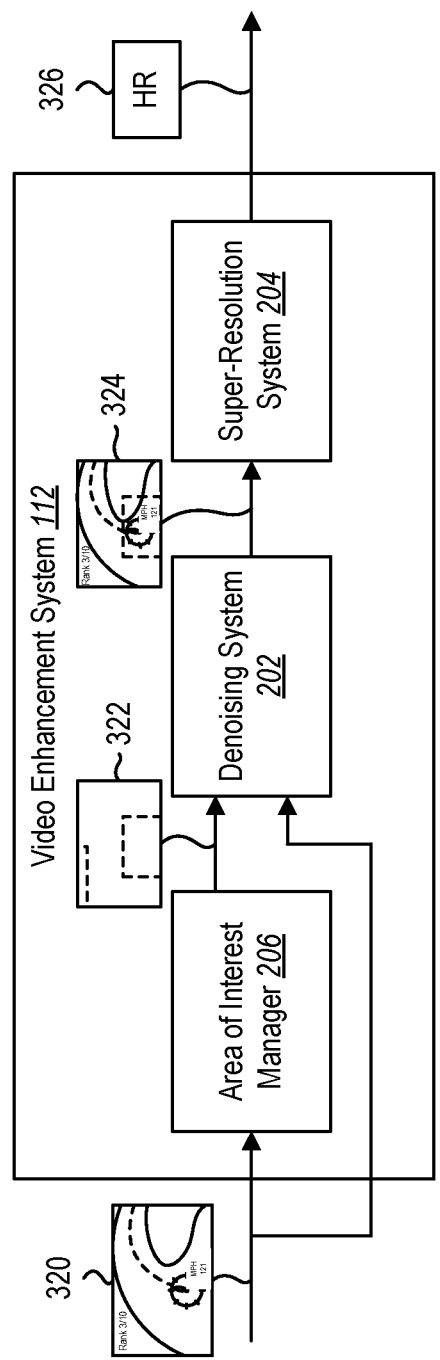
Figure 3C:
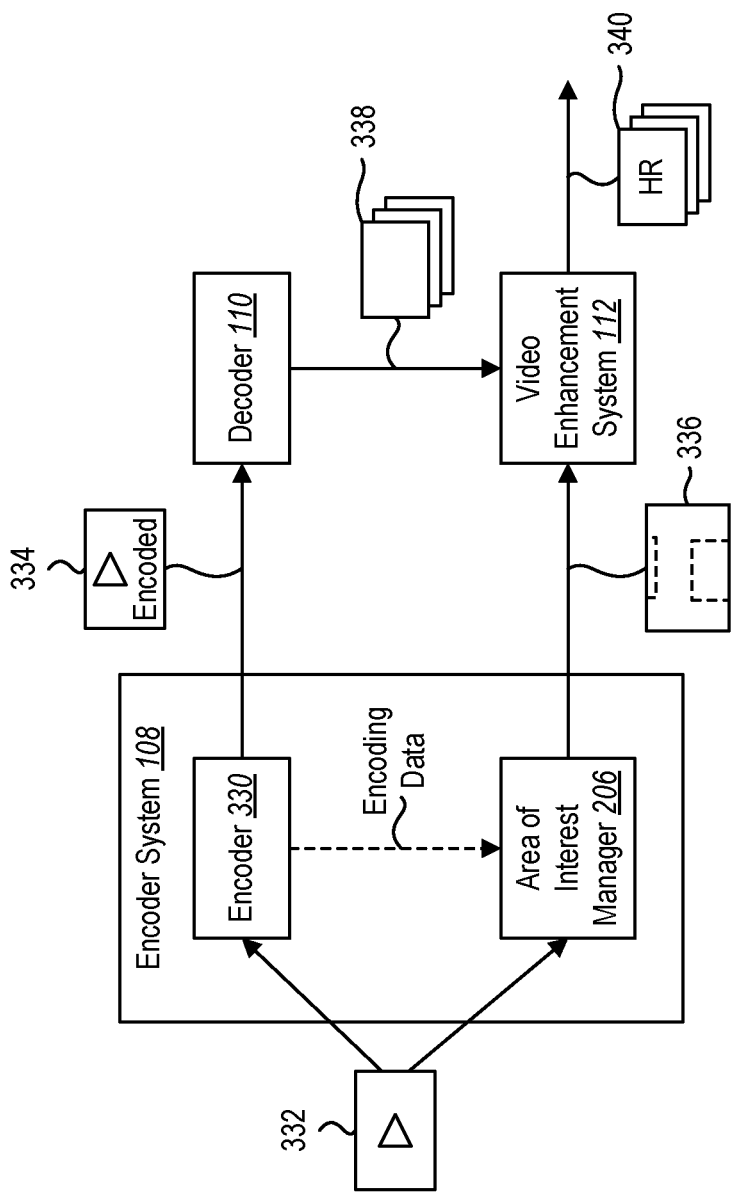

As mentioned above, the systems described herein can identify and utilize area of interest information in a variety of ways. For example, FIGS. 3A-3C illustrate example implementations in which an area of interest manager 206 may be implemented on either the server device(s) 102 or the client device 104. It will be appreciated that features and functionality described in connection with one or more of the specific illustrated examples may similarly apply to other examples described herein.

FIG. 3A illustrates an example implementation in which a video enhancement system 112 receives area of interest information from a remote source. For example, as shown in FIG. 3A, the denoising system 202 may receive a decompressed video frame 302 (e.g., from the decoder 110) including digital content reconstructed from a compressed digital video provided from an encoder system 108. For example, the decompressed video frame 302 may include a video frame from video game content generated by the video generation system 106.

As further shown in FIG. 3A, the decompressed video frame 302 includes a number of compression artifacts 304a-c. For instance, the video frame 302 includes a first compression artifact 304a at a top-left portion of the video frame 302, a second compression artifact 304b at a right-central portion of the video frame 302, and a third compression artifact 304c at a bottom-central position of the video frame 302. The compression artifacts 304a-b may represent any of a variety of types of localized flaws or inaccuracies within the video frame caused as a result of compressing and decompressing video content. As further shown, the example video frame 302 is from a car-racing video game application that includes displayed content such as a speed indicator and a rank indicator.

In addition to receiving the decompressed video frame 302, the denoising system 202 may further receive area of interest information including a segmentation map 306 that identifies pixel regions 308 within the video frame 302 that are of interest. In particular, the segmentation map 306 may include pixel regions 308 corresponding to heads-up display (HUD) elements or other graphical elements of the video frame 302 that have been tagged or otherwise identified as important areas of the display. For instance, as shown in FIG. 3A, the segmentation map 306 includes multiple pixel regions 308 corresponding to the speed indicator and player rank that appear within the decompressed video frame 302. The segmentation map 306 may include any number of identified areas of interest.

In the example shown in FIG. 3A, the identified pixel regions 308 may identified in a variety of ways. For example, in one or more embodiments, the pixel regions 308 may be identified by a developer of the video game content as important. In this case, the video content generator 106 may provide the area of interest information as part of the same transmission of data including the compressed video content. Alternatively, in one or more embodiments, an area of interest manager 206 implemented as part of the client device 104 or the server device(s) 102 may identify the area of interest information based on specific content or how the content is encoded. Additional examples in connection with how the area of interest information may be identified is discussed in further detail below (in connection with FIGS. 3B-3C).

As shown in FIG. 3A, the denoising system 202 may apply a denoising model to the compressed video frame 302 based information from the segmentation mask 306 to generate a repaired video frame 310 in which one or more compression artifacts have been removed from the decompressed video frame 302. For example, as shown in FIG. 3A, the denoising system 202 may specifically remove the third artifact 304c from a corresponding region of pixels identified within the segmentation mask 306. In this example, the denoising system 202 removes the third artifact 304c at a position within the decompressed video frame 302 corresponding to identified pixel regions 308 within the segmentation mask 306 without removing the first and second artifacts 304a-b from portions of the decompressed video frame 302 that do not correspond to the area of interest. In this way, the denoising system 202 may selectively remove one or more artifacts from within a video frame corresponding to regions of the video frame 302 that have been identified as important when providing a display of the video content.

The denoising system 202 may provide the repaired video frame 310 as input to the super-resolution system 204. In accordance with one or more embodiments described above, the super-resolution system 204 may up-sample, interpolate, or otherwise increase the resolution of the repaired video frame 310 to generate a high-resolution video frame 312 for display via a display device. In one or more embodiments, the super-resolution system 204 includes a super-resolution model trained to receive an input image (e.g., the repaired video frame 310) and generate a higher resolution output image (e.g., the high-resolution video frame 312) for display.

FIG. 3B illustrates another example implementation in which an area of interest manager 206 is implemented as part of the video enhancement system 112 on the client device 104. For example, the area of interest manager 206 may receive a decompressed video frame 320 including video content and various heads-up display (HUD) elements consistent with one or more examples discussed above. The video frame 302 may include any number of compression artifacts introduced as part of compressing and decompressing original video content generated by the video generation system 106.

The area of interest manager 206 may analyze the content of the video frame 302 to identify one or more regions of interest of the video frame 320 and generate a segmentation mask 322 including an indication of pixels corresponding to the area of interest. In one or more embodiments, the area of interest manager 206 includes a machine learning model trained to identify areas of interest based on different factors and parameters. For example, the area of interest manager 206 may implement a machine learning model trained to identify heads-up display (HUD) elements generally across a variety of types of video game content. This may include algorithms and models trained to identify graphical elements such as mini maps, floating text (e.g., text boxes that move between video frames), displayed menus, or other important content that end-users would prefer to be displayed at a higher quality whenever possible. In one or more embodiments, the area of interest manager 206 identifies different areas of interest for different video frames. For example, while many example areas of interest correspond to the same location for any video frame, the area of interest manager 206 may identify different areas of interest that move between frames (e.g., a floating display of text or other graphical element).

While the area of interest manager 206 may implement a machine learning model trained to identify areas of interest generally (e.g., across a wide range of different types of video content), the area of interest manager 206 may further implement a machine learning model trained with respect to a specific source of video content. For example, where a gaming application includes a limited number of heads-up display (HUD) interfaces, the area of interest manager 206 may implement a machine learning model specifically trained to identify areas of interest for the limited number of heads-up display (HUD) interfaces. Indeed, in this case, rather than training the machine learning model by providing a variety of different types of video frames and identified areas of interest, the machine learning model may be targeted to video content for the specific gaming application (or other video-based application) enabling the machine learning model to accurately identify areas of interest with significantly fewer training images than conventional machine learning models. Moreover, training an area of interest identification model in this way enables a client device 104 to efficiently identify areas of interest for incoming video frames without analyzing entire video frames to predict across entire images where areas of interest may be located.

In one or more embodiments, the area of interest manager 206 implements a machine learning model received from the server device(s) 102 and periodically updated based on further training. For example, the server device(s) 102 may provide a machine learning model to the client device 104 for implementation on the client device 104 (as shown in FIG. 3B) and periodically update the machine learning model based on generated video frames and associated area of interest information received over time. The server device(s) 102 may further provide an updated machine learning model that facilitates more accurate identification of areas of interest by the area of interest manager 206 over time. Along similar lines, the server device(s) may further update and provide updates to other machine learning models implemented on the video enhancement system 112 (e.g., a denoising model, a super resolution model).

Similar to one or more embodiments described above, the decompressed video frame 320 may be provided to the denoising system 202 for repairing one or more compression artifacts. The denoising system 202 may further receive the segmentation map 322 and selectively remove compression artifacts from portions of the decompressed video frame 320 that correspond to areas of interest identified within the segmentation map 322. Based on the decompressed video frame 320 and the segmentation map 322, the denoising system 202 may generate a repaired video frame 324 having one or more compression artifacts removed. The super-resolution system 204 may further generate a high resolution video frame 326 to provide for display via a graphical user interface of a display device.

FIG. 3C illustrates another example implementation in which the area of interest manager 206 is implemented as part of the encoder system 108 (e.g., on the server device(s) 102). As shown in FIG. 3C, original video content 332 (e.g., generated by the video generation system 106) may be provided as input to multiple components of the encoder system 108. In particular, the encoder 330 may receive the original video content 332 and compress the original video content 332 to generate encoded video content 334 to provide to a client device 104. For example, similar to the example discussed above in connection with FIG. 2, the encoder 330 may generate and provide the encoded video content 334 as input to a decoder 110 that decompresses the encoded video content 334 to generate a decompressed plurality of video frames 338 having one or more artifacts thereon. The decoder 110 can further provide the decompressed video frames 338 as inputs to the video enhancement system 112 for removing artifacts and generating high quality video frames 340.

In addition to the above-described process of generating encoded video content, the encoder system 108 may further include an area of interest manager 206 implemented thereon that identifies area of interest information from the original video content 332. For example, in one or more embodiments, the area of interest manager 206 analyzes content of the video 332 to identify heads-up display (HUD) elements, locations of displayed test, user input elements, and other area of interest information to provide to the video enhancement system 112 for use in selectively removing compression artifacts from decompressed video frames 338. For example, in one or more embodiments, the area of interest manager 206 generates a segmentation mask 336 or other composition buffer to provide to the video enhancement system 112 based on analyzed content from within the original video content 332.

In one or more embodiments, the area of interest manager 206 generates the image buffer for a range of multiple frames of the original video content 332 (e.g., where an overlay remains uniform over multiple video frames). Alternatively, the area of interest manager 206 may generate different image buffers over different durations of the video content 332 as content displayed within the video content 332 changes over time.

Moreover, in one or more embodiments, the area of interest manager 206 generates the segmentation mask 336 using multiple area of interest identification techniques discussed herein. For example, the area of interest manager 206 may identify one or more areas of interest based on information provided by a developer or information received directly from the video generation system 106. In addition, the area of interest manager 206 may identify one or more additional areas of interest based on a variable rate shading technique based on compression rates applied when generating the encoded video content 334.

In one or more embodiments, one or more of the systems described herein may apply a variable rate shading analysis to original video content 332 based on colors, shading, and other content. As an example, the video generation system 106 may perform a series of operations in connection with adding shading to an image or series of video frames. For instance, the video generation system may implement a variable rate shading system that analyzes frame data (e.g., data used in generating uncompressed video frames prior to encoding) to determine where shading can be calculated at a higher or lower precision to reduce calculations without significantly reducing the quality of shading applied to the video content.

As an illustrative example, where a dark corner of a room will be shaded, but the difference in shading between adjacent pixels is low (e.g., where adjacent pixels simply appear as similar measures of "dark" to an end-user), a variable rate shading system may decide that the corresponding area of the video frame may be shaded at a low precision rate. An area of interest manager 206 may utilize this information by assuming that areas of low-precision shading are not as important to the overall quality of the output video content and are therefore less important than other areas of video frames.

Based on variable rate shading information, the area of interest manager 206 may assign or otherwise identify areas of interest based on a precision of shading applied to different portions of the video content. For instance, the area of interest manager 206 may identify areas of interest based on a determining that those areas of interest are not associated with low-precision shading rates (e.g., shading rates below a predetermined threshold). In one or more embodiments, the video generation system 106 provides a variable rate shading map (e.g., a variable rate shading buffer) to the area of interest manager 206 (on either the server or client device) that includes an identification of areas for which low-precision shading is present. The area of interest manager 206 may utilize this information when denoising and otherwise processing a decompressed video frame in accordance with one or more implementations described herein.

Figure 4:
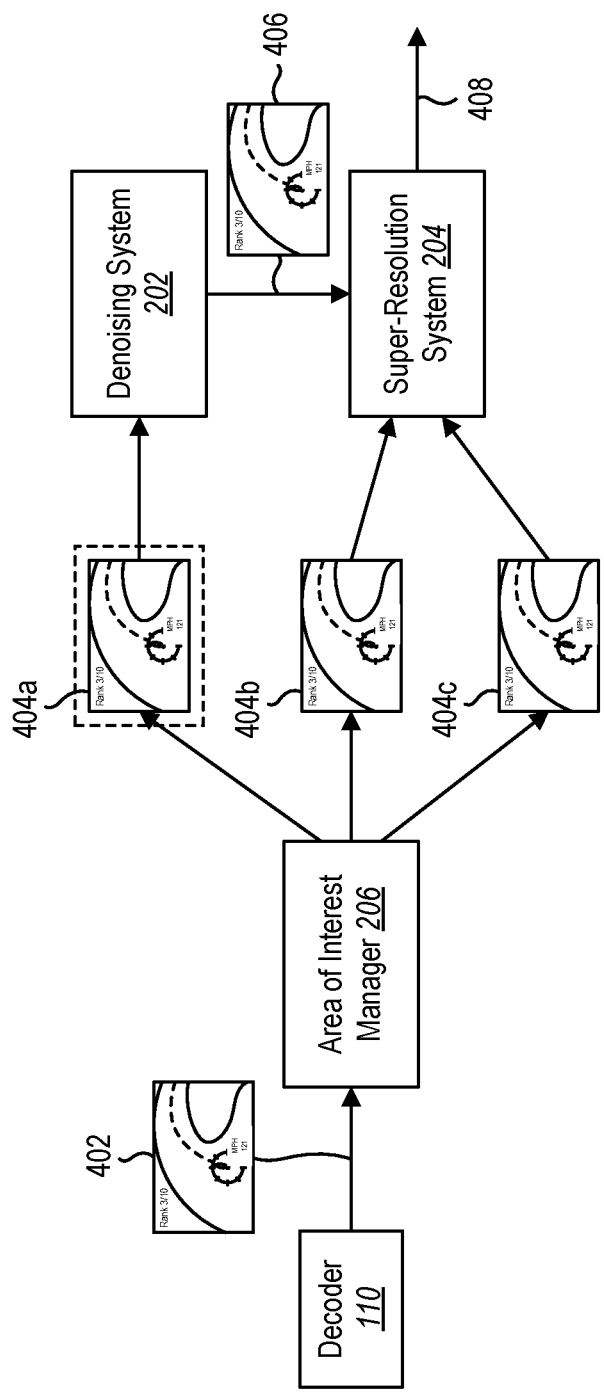
FIG. 4 illustrates an example implementation that involves identifying an area of interest for a video frame in accordance with one or more embodiments.

While one or more embodiments described above relate to identifying areas of interest defined by select pixels or regions of pixels within a digital video frame, in one or more embodiments, the area of interest may additionally or alternatively refer to one or more overlays or channels that collectively make up an image frame. For example, FIG. 4 illustrates an example in which the area of interest manager 206 receives a decompressed digital video frame 402 and identifies a first color channel 404a from a plurality of color channels 404a-c as the area of interest to be provided to a denoising system 202 and/or super-resolution system 204. Accordingly, as shown in FIG. 4, the area of interest manager 206 identifies a first color channel 404a to provide to the denoising system 202 for removing compression artifacts from the first color channel 404a and provides the additional color channels 404b-c as inputs to the super-resolution system 204 to be processed in connection with the repaired video frame 406 provided by the denoising system 202.

The color channels 404a-c may refer to a variety of different portions of a video frame. As a first example, the color channels 404a-c may refer to a YCbCr family of channels with the first color channel 404a referring to a luminance channel, the second color channel 404b referring to a first chroma channel (e.g., a chroma blue channel), and the third color channel 404c referring to a second chroma channel (e.g., a chroma red channel). As an alternative to a YCbCr family of channels, the color channels 404a-c may refer to discrete color channels of an RGB image. Indeed, where a video frame includes multiple composite images that collectively form a video frame, the color channels 404a-c may refer to any number of channels or portions of a composite image.

Moreover, while FIG. 4 illustrates an example in which the first channel 404a is provided to the denoising system 202 while the second channel 404b and the third channel 404c are provided to the super-resolution system, in one or more embodiments, only the first color channel 404a is provided as input to the denoising system 202 and the super-resolution system 204 and combined with the remaining color channels 404b-c after generating a high resolution first channel 404a with one or more artifacts removed therefrom. In this way, the video enhancement system 112 can further preserve local processing resources of the client device 104 where possible (e.g., where the additional color channels 404b-c provide negligible benefit in providing to the denoising system 202 and/or super resolution 204 for further refinement). Indeed, in one or more implementations, by removing artifacts and otherwise enhancing only a single channel (e.g., the luminance channel), the video enhancement system 112 can generate a high-quality image without expending additional processing power to enhance other channels (e.g., the chroma channels) of the same video frame.

In one or more embodiments, the features and functionality described in connection with identifying an area of interest that includes a region of pixels (as discussed in connection with FIGS. 2-3C) may be combined with the select enhancement of a color channel described in connection with FIG. 4. For example, in addition to identifying a region of pixels from a video frame for selective enhancement, the area of interest manager 206 may additionally identify a select color channel from the region of pixels to further reduce the amount of processing performed by the video enhancement system 112 when enhancing the video frame for display. Indeed, by combining multiple techniques discussed herein, the video enhancement system 112 can selectively enhance video frames having a high bit rate while maintaining high performance and without draining battery or data resources of the client device 104.

Figure 5:
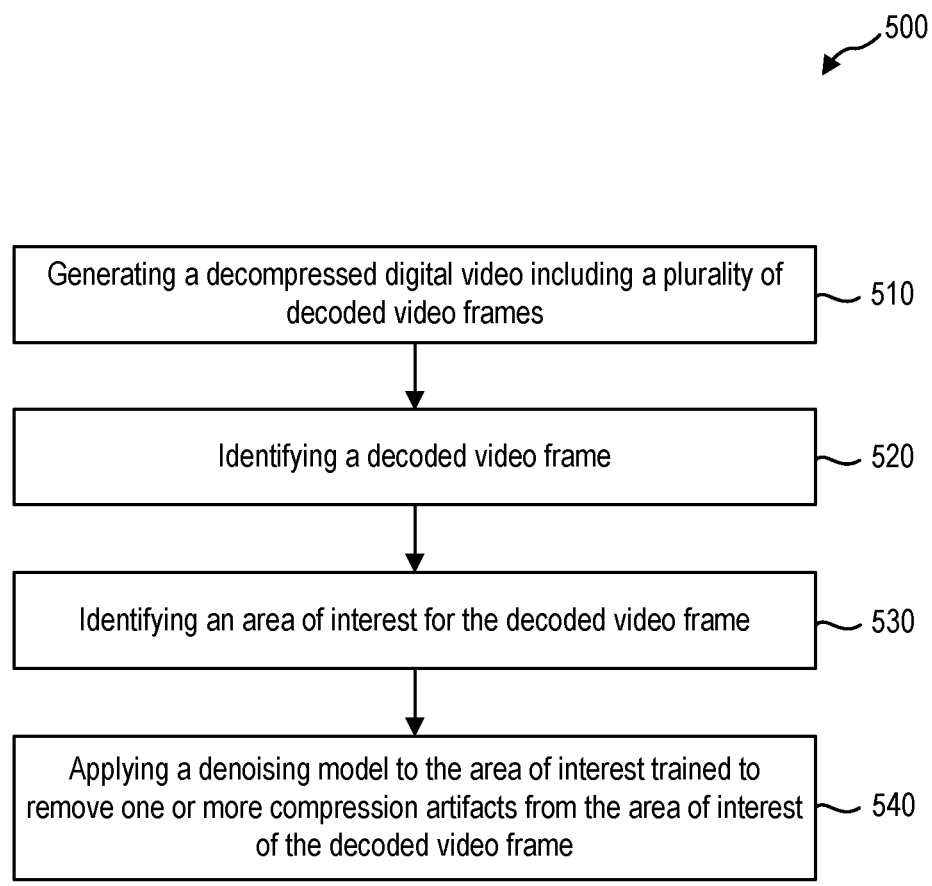
FIG. 5 illustrates an example method for enhancing digital video content in accordance with one or more embodiments.
Figure 6:
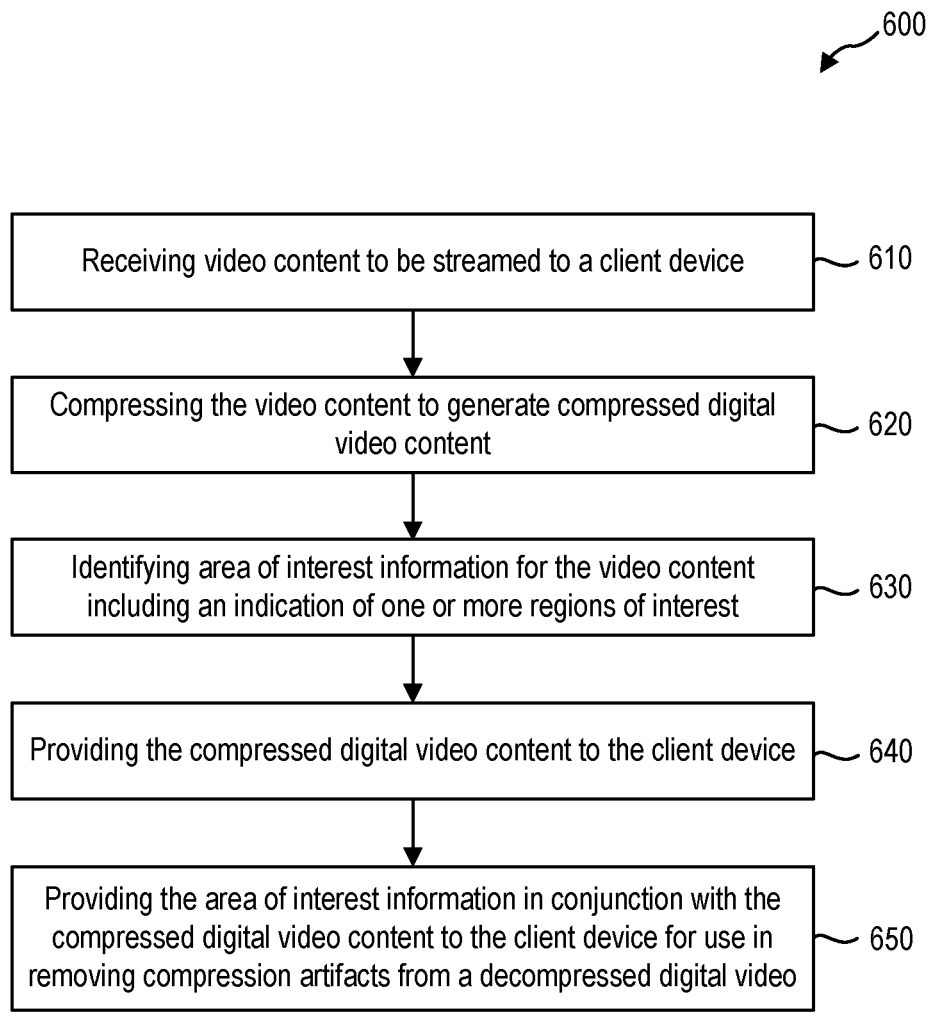
FIG. 6 illustrates an example method for encoding video content and identifying an area of interest for use in enhancing digital video content in accordance with one or more embodiments.

Turning now to FIGS. 5-6, these figures illustrate example flowcharts including series of acts for selectively enhancing video content based on identified areas of interest of the video content. While FIGS. 5-6 illustrate acts according to one or more embodiments, alternative embodiments may omit, add to, reorder, and/or modify any of the acts shown in FIGS. 5-6. Moreover, one or more of the individual features and functionalities described in connection with individual acts or series of acts in connection with FIG. 5 or FIG. 6 may similarly apply to other embodiments and examples described herein. The acts of FIGS. 5-6 can be performed as part of a method. Alternatively, a non-transitory computer-readable medium can include instructions that, when executed by one or more processors, cause a computing device to perform the acts of FIGS. 5-6. In still further embodiments, a system can perform the acts of FIGS. 5-6.

FIG. 5 illustrates a series of acts 500 for selectively refining a decoded video frame in accordance with one or more implementations. As shown in FIG. 5, the series of acts 500 includes an act 510 of generating a decompressed digital video including a plurality of decoded video frames. For example, the act 510 may include decompressing compressed digital video content to generate decompressed digital video content including a plurality of decoded video frames.

As further shown in FIG. 5, the series of acts 500 includes an act 520 of identifying a decoded video frame. For example, the at 520 may include identifying a decoded video frame from the plurality of decoded video frames.

The series of acts 500 may further include an act 530 of identifying an area of interest for the decoded video frame. For example, the act 530 may include identifying an area of interest for the decoded video frame that includes a portion of the decoded video frame. In one or more embodiments, identifying the area of interest includes identifying one or more discrete regions of pixels of the decoded video frame.

In one or more embodiments, identifying the area of interest includes identifying a first color channel from a plurality of color channels that collectively make up the decoded video frame. Identifying the first color channel may include identifying a luminance channel from a family of color channels including the luminance channel, a first chroma channel, and a second chroma channel.

In one or more embodiments, identifying the area of interest includes receiving an identification of the area of interest from a server device in conjunction with receiving the compressed digital video from the server device. Receiving the identification of the area of interest may include receiving a composition buffer including a segmentation mask for the decoded video frame where the segmentation mask includes an indication of important content within the decoded video frame. In one or more implementations, the segmentation mask indicates one or more head-up display (HUD) elements including information displayed as part of a graphical user interface of a live video stream. In one or more implementations, receiving the identification of the area of interest includes receiving a variable rate shading buffer indicating areas of the decoded video frame associated with different precision rates of shading.

The series of acts may also include an act 540 of applying a denoising model to the area of interest trained to remove one or more compression artifacts from the area of interest of the decoded video frame. For example, the act 540 may include applying a denoising model to the portion of the decoded video frame to generate a denoised video frame in which one or more compression artifacts from the area of interest for the decoded video frame have been removed.

The denoising model may include a machine learning model trained to receive an input image including at least one compression artifact and generate an output image in which the at least one compression artifact has been removed. The denoising model may be trained based on pairs of training images, which may include a first plurality of non-compressed images and a second plurality of decompressed digital images based on the first plurality of non-compressed images after being compressed.

The series of acts 500 may further include applying a super resolution model to the denoised video frame to generate an output video frame having a higher resolution than the decoded video frame. The super resolution model may include another machine learning model trained to receive an input digital image having an input resolution to generate an output digital image based on the input digital image having a higher resolution than the input resolution.

The series of acts 500 may additionally include identifying areas of interest for additional decoded video frames from the plurality of decoded video frames where the areas of interest include respective portions of the additional decoded video frames. The series of acts 500 may further include applying the denoising model to each of the respective portions of the additional decoded video frames to generate a plurality of denoised video frames in which compression artifacts from the areas of interest for the decoded video frame have been removed.

FIG. 6 illustrates another example series of act 600 for selectively enhancing digital video content in accordance with one or more embodiments described herein. As shown in FIG. 6, the series of acts 600 may include an act 610 of receiving video content to be streamed to a client device. For example, the act 610 may include receiving video content to be streamed to a client device where the video content includes a plurality of non-compressed video frames. As further shown in FIG. 6, the series of acts 600 may include an act 620 of compressing the video content to generate compressed digital video content.

As further shown, the series of acts 600 may include an act 630 of identifying area of interest information for the video content including an indication of one or more regions of interest. For example, the act 630 may include identifying area of interest information for the video content that includes an indication of one or more discrete regions of content from the video content. In one or more embodiments, identifying the area of interest information includes receiving, in conjunction with receiving the video content, identified areas of importance within the received video content. The identified areas of importance within the received video content may indicate one or more head-up display (HUD) elements including information displayed as part of a graphical user interface of a live video stream.

The series of acts 600 may additionally include an act 640 of providing the compressed digital video content to the client device. The series of acts 600 may further include an act 650 of providing the area of interest information in conjunction with the compressed digital video content to the client device for use in removing compressing artifacts from a decompressed digital video. The act 650 may include providing the area of interest information in conjunction with the compressed digital video content to the client device for use in removing compression artifacts from identified regions of pixels from decoded video frames associated with the area of interest information.

In one or more embodiments, identifying the area of interest information includes generating a segmentation mask including an identification of regions of video frames corresponding to areas of importance within the received video content. In addition, providing the area of interest information may include providing the segmentation mask to the client device for use in selectively removing compression artifacts from the decoded video frames.

In one or more implementations, identifying the area of interest information includes identifying portions of the compressed digital video content associated with different precision rates of shading. In addition, providing the area of interest information may include providing information associated with the different precision rates of shading for different portions of the compressed digital video content to the client device for use in selectively removing artifacts from the decoded video frames.

Figure 7:
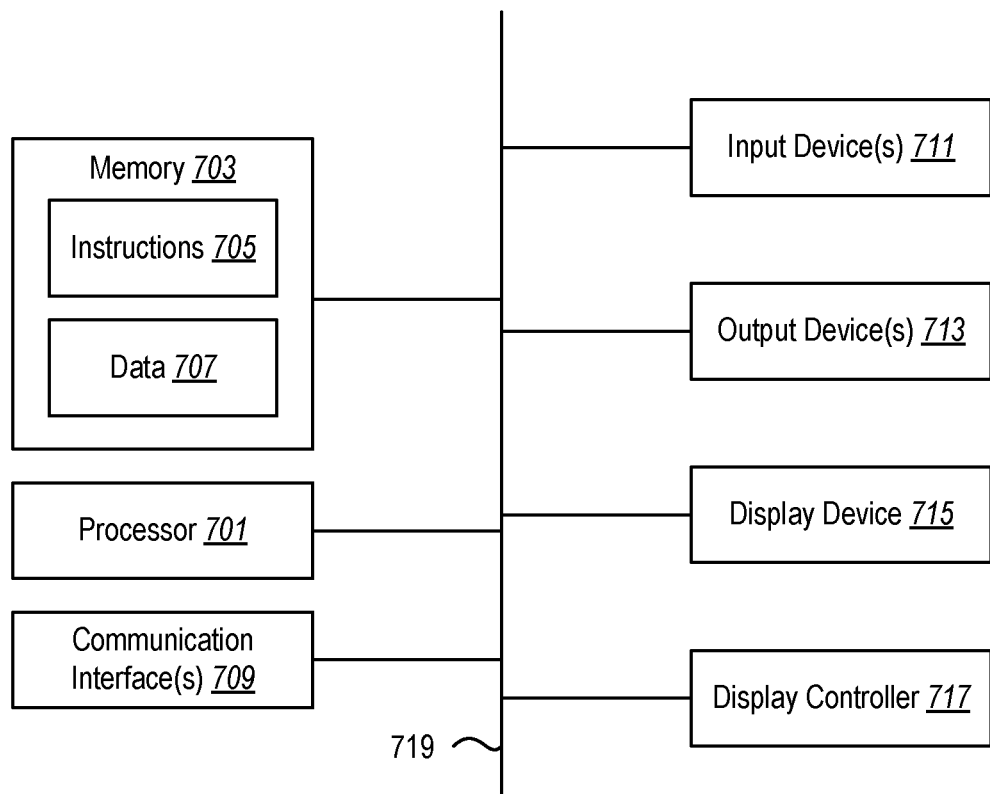
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:
1. A method, comprising:
   decompressing compressed digital video content to generate decompressed digital video content including a plurality of decoded video frames;
   identifying a decoded video frame from the plurality of decoded video frames;

identifying a first color channel of the decoded video frame from a plurality of color channels that collectively make up the decoded video frame; and selectively applying a denoising model to the first color channel of the decoded video frame to generate a denoised video frame in which one or more compression artifacts from the first color channel of the decoded video frame has been removed, wherein the denoising model comprises a machine learning model trained to receive an input image including at least one compression artifact and generate an output image in which the at least one compression artifact has been removed.

2. The method of claim 1, wherein the denoising model is trained based on pairs of training images, the pairs of training images including a first plurality of non-compressed images and a second plurality of decompressed digital images based on the first plurality of non-compressed images after being compressed.

3. The method of claim 1, further comprising applying a super resolution model to the denoised video frame to generate an output video frame having a higher resolution than the decoded video frame, wherein the super resolution model comprises a second machine learning model trained to receive an input digital image having an input resolution to generate an output digital image based on the input digital image having a higher resolution than the input resolution.

4. The method of claim 1, wherein the first color channel comprises a luminance channel from a family of color channels including the luminance channel, a first chroma channel, and a second chroma channel.

5. The method of claim 1, wherein the plurality of color channels includes a red channel, a green channel, and a blue channel of a red green blue (RGB) image.

6. The method of claim 1, further comprising:
identifying first color channels of additional decoded video frames from the plurality of decoded video frames; and
selectively applying the denoising model to each of the identified first color channels of the additional decoded video frames to generate a plurality of denoised video frames in which compression artifacts from the first portions for the additional decoded video frames have been removed.

7. The method of claim 1, wherein selectively applying the denoising model includes applying the denoising model to the first color channel of the decoded video frame without applying the denoising model to one or more additional color channels that collectively make up the decoded video frame.

8. The method of claim 1, further comprising receiving a segmentation mask for the decoded video frame, the segmentation mask including an identified area of interest indicating high priority regions of content within the decoded video frame, wherein selectively applying the denoising model includes applying the denoising model to the identified area of interest of the first color channel of the decoded video frame.

9. The method of claim 8, wherein the area of interest is identified based on one or more heads-up display (HUD) elements within the decoded video frame, the HUD elements including information displayed as part of a graphical user interface of a live video stream.

10. The method of claim 8, wherein the segmentation mask is received from a server device in conjunction with receiving the compressed digital video from the server device.

11. A method, comprising:
decompressing compressed digital video content to generate decompressed digital video content including a plurality of decoded video frames;
identifying a decoded video frame from the plurality of decoded video frames;
receiving a segmentation mask for the decoded video frame, the segmentation mask including a variable rate shading buffer indicating one or more areas of interest within the decoded video frame based on different precision rates of shading; and
selectively applying a denoising model to the one or more areas of interest within the decoded video frame indicated by the variable rate shading buffer to generate a denoised video frame in which one or more compression artifacts from the one or more areas of interest of the decoded video frame has been removed, wherein the denoising model comprises a machine learning model trained to receive an input image including at least one compression artifact and generate an output image in which the at least one compression artifact has been removed.

12. The method of claim 11, wherein the variable rate shading buffer is received from a server device in conjunction with receiving the compressed digital video from the server device.

13. The method of claim 11, wherein the variable rate shading buffer indicates the one or more areas of interest based on the one or more areas of interest having a higher precision shading rate than a predetermined precision rate threshold.

14. The method of claim 11, wherein the denoising model is trained based on pairs of training images, the pairs of training images including a first plurality of non-compressed images and a second plurality of decompressed digital images based on the first plurality of non-compressed images after being compressed.

15. The method of claim 11, further comprising applying a super resolution model to the denoised video frame to generate an output video frame having a higher resolution than the decoded video frame, wherein the super resolution model comprises a second machine learning model trained to receive an input digital image having an input resolution to generate an output digital image based on the input digital image having a higher resolution than the input resolution.

16. The method of claim 11, wherein selectively applying the denoising model includes applying the denoising model to the one or more areas of interest of within the decoded video frame without applying the denoising model to other portions of the decoded video frame.

17. A system, comprising:
one or more processors;
memory in electronic communication with the one or more processors; and instructions stored in the memory, the instructions being executable by the one or more processors to:
decompress compressed digital video content to generate decompressed digital video content including a plurality of decoded video frames;
identify a decoded video frame from the plurality of decoded video frames;
identify a first color channel of the decoded video frame from a plurality of color channels that collectively make up the decoded video frame; and
selectively apply a denoising model to the first color channel of the decoded video frame to generate a denoised video frame in which one or more compression artifacts from the first color channel of the decoded video frame has been removed, wherein the denoising model comprises a machine learning model trained to receive an input image including at least one compression artifact and generate an output image in which the at least one compression artifact has been removed.

18. The system of claim 17, wherein the first color channel comprises a luminance channel from a family of color channels including the luminance channel, a first chroma channel, and a second chroma channel.

19. The system of claim 17, wherein selectively applying the denoising model includes applying the denoising model to the first color channel of the decoded video frame without applying the denoising model to one or more additional color channels that collectively make up the decoded video frame.

20. The system of claim 17, further comprising instructions being executable by the one or more processors to:
- identify first color channels of additional decoded video frames from the plurality of decoded video frames; and
- selectively applying the denoising model to each of the identified first color channels of the additional decoded video frames to generate a plurality of denoised video frames in which compression artifacts from the first portions for the additional decoded video frames have been removed.

* * * * *